H. E. VOSBURGH.
THILL COUPLING.
APPLICATION FILED APR. 11, 1908.

930,246.

Patented Aug. 3, 1909.

2 SHEETS—SHEET 1.

WITNESSES
S. M. Gallagher
E. N. Schofield

INVENTOR
Henry E. Vosburgh
BY
ATTORNEY

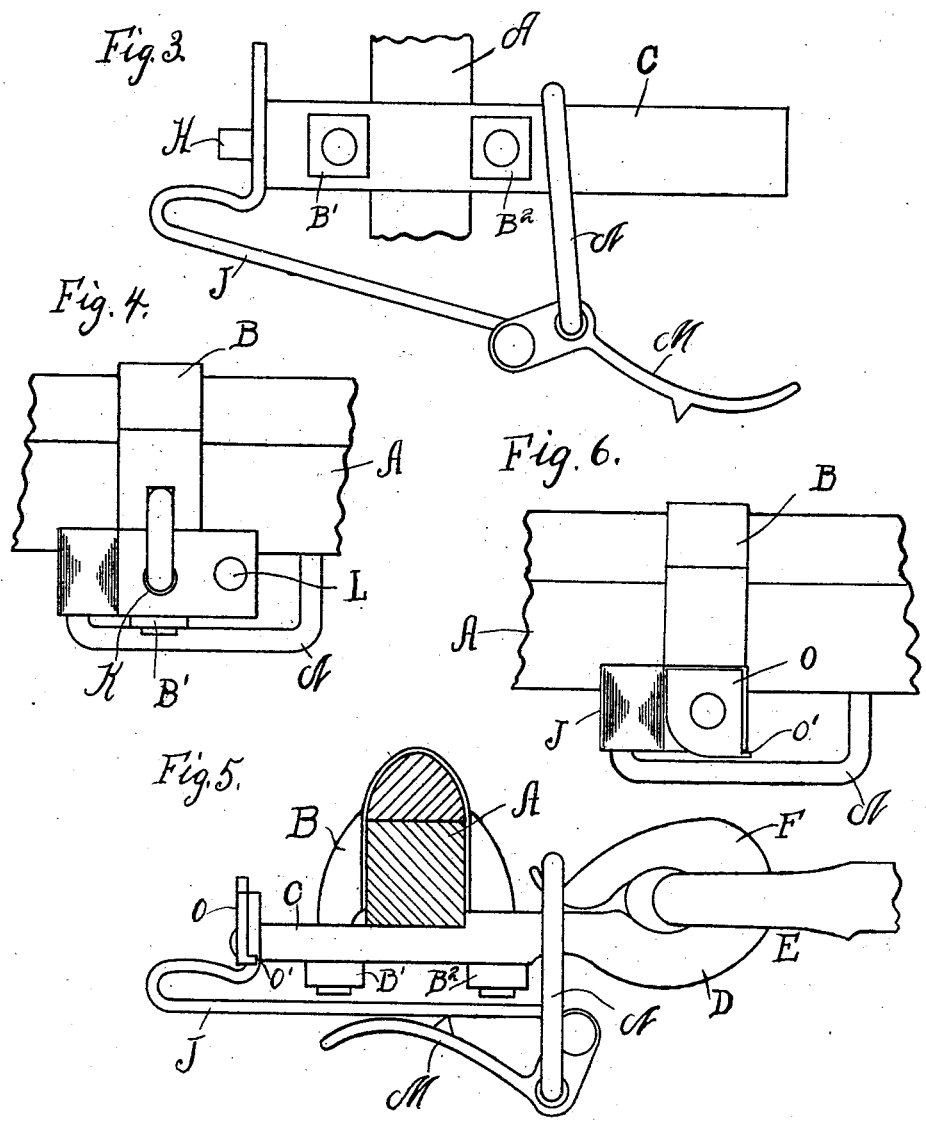

UNITED STATES PATENT OFFICE.

HENRY E. VOSBURGH, OF NORRISTOWN, PENNSYLVANIA, ASSIGNOR TO SAMUEL D. RHOADES, OF PHOENIXVILLE, AND JOHN J. QUAY, OF NORRISTOWN, PENNSYLVANIA.

THILL-COUPLING.

No. 930,246.     Specification of Letters Patent.     Patented Aug. 3, 1909.

Application filed April 11, 1908. Serial No. 426,447.

*To all whom it may concern:*

Be it known that I, HENRY E. VOSBURGH, a citizen of the United States, residing at Norristown, county of Montgomery, and State of Pennsylvania, have invented a certain new and useful Improvement in Thill-Couplings, of which the following is a specification.

My invention relates to a new and useful improvement in thill couplings, and has for its object to provide an exceedingly simple and effective device of this character, by means of which the nuts may be readily and securely threaded upon the clips for holding the coupling to the fore axle of a vehicle.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
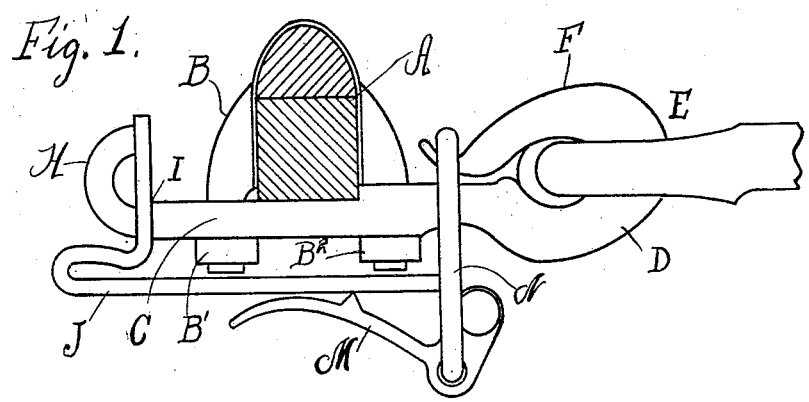
Figure 2:
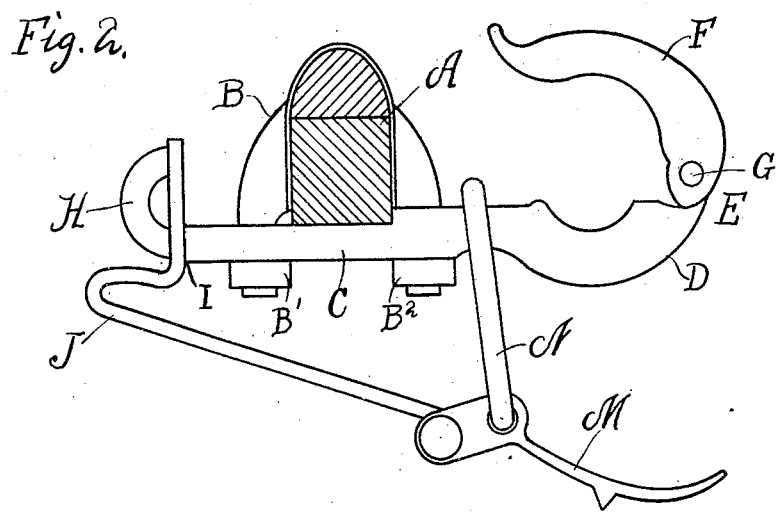

Figure 1 is a side elevation of my improvement in a closed position secured to an axle, showing the rear portion of a thill iron in place. Fig. 2, is a side elevation thereof in an open position, the thill iron being detached. Fig. 3, is a plan view of my improvement, the spring being turned over to one side. Fig. 4, is a rear end view thereof. Fig. 5, a side elevation of a slightly modified form of my improvement. Fig. 6, a rear end view thereof.

In carrying out my invention as here embodied, A represents the fore axle of a vehicle, and B the clip which holds the coupling C to the axle when the nuts B' and B² are threaded on said clip. The forward end of said coupling has formed therewith a stationary jaw D of the clamp E, and to this is pivoted a movable jaw F at G. The rear end of said coupling is formed into the shape of a hook H, and on this said hook portion is formed the shoulder I.

The spring J has an opening K formed therein a suitable distance from the outer end thereof, through which passes the hook portion H, the end of said hook portion engaging with the locking notch L formed on the outer portion of the spring J above the opening K. To the forward end of the spring J is fastened the lever M and to this lever is secured the link N, which fits over the clamp E and rests upon the rear portion of the movable jaw thereof for holding said jaw in a closed position. In Fig. 5 I have shown the spring J riveted to the rear end of the coupling C, having a stop washer O interposed between the head of the rivet and the spring, so positioned that when said spring is brought to the position shown in Fig. 6 it will come in contact with the stop O', and so be prevented from further rotative movement toward the axle A.

It is a very difficult matter to place the nuts B' and B² upon the clip B when a thill coupling is being placed upon the axle of a vehicle where a stationary spring is used, but by the use of my improvement this is entirely overcome, as the lever M may be loosened allowing the spring J to be turned to one side as shown in Fig. 3, so that a socket wrench may be placed upon the nuts and the latter readily, quickly and tightly threaded on the clip. When this has been done the spring J would be again brought beneath the coupling when the end of the hook H would engage with the locking notch L, which would hold the spring in a horizontal position allowing the link N to be placed upon the jaw F, when the lever would be brought back to the position shown in Fig. 1, thus locking the clamp E.

Having thus fully described my invention, what I claim as new and useful, is—

1. A thill-coupling, having in combination, a shank adapted to be secured below an axle, a clip for securing said shank, a thill-iron clamp at the forward end of said shank, a link adapted to close said clamp, a spring attached to the rear end of, and extending below, said shank, to exert a tension on said link, said spring being pivotally attached to said shank and adapted to be locked in its downwardly extended position, whereby it may be swung laterally from below said shank to afford ready access to the nuts securing said shank and clip.

2. A thill-coupling comprising a clip-secured shank, a thill-iron clamp at its forward end, a cam operated link for closing said clamp, a curved projection at the rear end of said shank and a spring secured to said rear curved projection and extending forwardly below said shank to exert a tension on said link, said spring securing means comprising a vertical tongue pivotally mounted on said curved projection and having a locking notch for engagement with said curved projection, whereby said spring may be swung laterally from below said thill-coupling to allow ready access to the nuts securing said clip and shank.

3. A thill-coupling comprising a clip-secured shank adapted to be secured below an axle, a link-closed clamp at its forward end, a cam-lever for closing said clamp, an upstanding curved projection at the rear end of said shank, and a spring pivoted on said rear upstanding projection and operatively connected to said cam-lever to exert a tension thereon, said spring being provided with a goose-necked portion terminating in an upstanding vertical tongue, said tongue comprising the pivotal bearing for said spring and a means for locking said spring in its downwardly extended position, whereby said spring may be swung laterally from below said coupling to afford ready access to the nuts securing said coupling to the axle.

In testimony whereof, I have hereunto affixed my signature in the presence of two subscribing witnesses.

HENRY E. VOSBURGH.

Witnesses:
THOMAS W. FAULKNER,
E. M. HARRY.